United States Patent
Fatemi et al.

(10) Patent No.: US 12,368,331 B2
(45) Date of Patent: Jul. 22, 2025

(54) MOTOR WITH STATOR TOOTH TIP COOLING

(71) Applicant: GM Global Technology Operations LLC, Detroit, MI (US)

(72) Inventors: Alireza Fatemi, Canton, MI (US); Farzad Samie, Franklin, MI (US); Thomas W. Nehl, Shelby Township, MI (US); Chandra S. Namuduri, Troy, MI (US); Gokhan Cakal, Madison, WI (US)

(73) Assignee: GM GLOBAL TECHNOLOGY OPERATIONS LLC, Detroit, MI (US)

(\*) Notice: Subject to any disclaimer, the term of this patent is extended or adjusted under 35 U.S.C. 154(b) by 279 days.

(21) Appl. No.: 18/300,841

(22) Filed: Apr. 14, 2023

(65) Prior Publication Data

US 2024/0348113 A1    Oct. 17, 2024

(51) Int. Cl.
*H02K 1/20* (2006.01)
*H02K 1/16* (2006.01)

(52) U.S. Cl.
CPC .............. *H02K 1/20* (2013.01); *H02K 1/165* (2013.01)

(58) Field of Classification Search
CPC ............ H02K 1/20; H02K 1/16; H02K 1/165; H02K 9/19; H02K 9/193; H02K 9/197; H02K 9/20; H02K 2209/00
USPC .......................................... 310/52, 54, 58, 59
See application file for complete search history.

(56) References Cited

U.S. PATENT DOCUMENTS

| | | | | |
|---|---|---|---|---|
| 3,684,906 A | * | 8/1972 | Lenz | H02K 17/16 310/64 |
| 5,250,867 A | * | 10/1993 | Gizaw | H02K 21/16 310/216.069 |
| 2003/0062780 A1 | * | 4/2003 | Kaneko | H02K 3/24 310/58 |
| 2012/0104895 A1 | * | 5/2012 | Ramu | G01B 11/26 310/216.106 |
| 2014/0252894 A1 | * | 9/2014 | Dutau | H02K 1/325 310/59 |
| 2016/0301286 A1 | * | 10/2016 | Salter | H02K 9/10 |
| 2018/0054095 A1 | * | 2/2018 | Dlala | H02K 1/16 |
| 2019/0020231 A1 | * | 1/2019 | Dlala | H02K 9/19 |

\* cited by examiner

*Primary Examiner* — Michael Andrews
(74) *Attorney, Agent, or Firm* — CANTOR COLBURN LLP (57) ABSTRACT

An electric propulsion motor system includes a cylindrical stator and rotor, a fluid circulation system providing pressurized fluid, and conductors within winding slots. The stator has a yoke and a plurality of teeth extending radially inward from the yoke, with winding slots defined between adjacent teeth. Respective tooth tips extend circumferentially into adjacent winding slots and are radially adjacent to a first conductor within the winding slot, with a first channel through which pressurized fluid flows.

18 Claims, 6 Drawing Sheets

MOTOR WITH STATOR TOOTH TIP COOLING

INTRODUCTION

Electric vehicles (EV) include one or more electric propulsion motors. Such motors may be lubricated and cooled with circulating fluids, including fluids circulating through stator and rotor structures. Known stator cooling fluid circulation paths may include stator jacket containments, axial passages through the stator yoke and axial passages through the stator teeth. However, a major source of stator heat may include the stator winding and primarily the windings at the top of the stator winding slots.

SUMMARY

In one exemplary embodiment, an electric machine may include a cylindrical stator including a yoke and radially extending teeth, the teeth being circumferentially spaced one from another to define winding slots between adjacent teeth, multiple conductors disposed within the winding slots, and at least one of the teeth including a tooth tip extending circumferentially toward an adjacent tooth and being radially adjacent a first one of the multiple conductors, the tooth tip having a first channel through which a pressurized fluid flows.

In addition to one or more of the features described herein, the electric machine may further include a radial fluid passage through the yoke and the at least one of the teeth providing the pressurized fluid to the first channel.

In addition to one or more of the features described herein, the first channel may be fluidly coupled to first fluid outlets at axially opposite ends of the stator.

In addition to one or more of the features described herein, the first fluid outlets may direct the pressurized fluid as it exits the stator onto end turns of the conductors at the axially opposite ends of the stator.

In addition to one or more of the features described herein, the electric machine may further include a second channel oriented axially through the yoke and fluidly coupled to the radial fluid passage.

In addition to one or more of the features described herein, the second channel may be fluidly coupled to second fluid outlets at axially opposite ends of the stator.

In addition to one or more of the features described herein, the second fluid outlets may direct the pressurized fluid as it exits the stator onto end turns of the conductors at the axially opposite ends of the stator.

In addition to one or more of the features described herein, the tooth tip may be circumferentially adjacent a second one of the multiple conductors.

In addition to one or more of the features described herein, the tooth tip may be radially inboard of an extreme radial position of the tooth.

In addition to one or more of the features described herein, the first fluid outlets may be through end plates fabricated from multiple electrical steel laminations.

In another exemplary embodiment, an electric propulsion motor system may include an electric propulsion motor having a cylindrical stator and a rotor rotatably disposed within the stator, a fluid circulation system providing a pressurized fluid, the cylindrical stator including a yoke and a plurality of teeth extending radially inward from the yoke at proximal ends to an inner periphery at distal ends, the plurality of teeth circumferentially arranged in spaced adjacency to define winding slots between adjacent teeth, a respective plurality of conductors disposed within each winding slot and forming end turns outside of the winding slots at axially opposite ends of the stator, and a set of the plurality of teeth including respective tooth tips extending circumferentially into respective adjacent winding slots and being radially adjacent a first one of the respective plurality of conductors disposed within the respective adjacent winding slot, the respective tooth tips having a respective first channel through which the pressurized fluid flows.

In addition to one or more of the features described herein, each respective first channel may be fluidly coupled to the pressurized fluid through a respective radial fluid passage.

In addition to one or more of the features described herein, each respective first channel may be fluidly coupled to respective first fluid outlets directing the pressurized fluid as it exits the stator onto the end turns outside of the winding slots at axially opposite ends of the stator.

In addition to one or more of the features described herein, the electric propulsion motor system may further include a plurality of second channels oriented axially through the yoke and fluidly coupled to the pressurized fluid.

In addition to one or more of the features described herein, the plurality of second channels may be fluidly coupled to second fluid outlets directing the pressurized fluid as it exits the stator onto the end turns outside of the winding slots at axially opposite ends of the stator.

In addition to one or more of the features described herein, each respective tooth tip may be circumferentially adjacent a second one of the respective plurality of conductors disposed within the respective adjacent winding slot.

In addition to one or more of the features described herein, each respective tooth tip may be radially inboard of the inner periphery.

In addition to one or more of the features described herein, the first fluid outlets may be through end plates.

In addition to one or more of the features described herein, the pressurized fluid may flow through the rotor.

In yet another exemplary embodiment, an electrified vehicle may include an electric drive unit having an electric propulsion motor with a cylindrical stator with fluid passages therethrough and a fluid pump providing pressurized fluid to the fluid passages, and the fluid passages through the stator may include axial passages within stator tooth tips wherein the stator tooth tips extend into adjacent winding slots and are adjacent at least one conductor disposed within a respective adjacent winding slot.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference labels indicate like or corresponding parts and features. Description of parts and features in one drawing is understood to apply to parts and features in other drawings sharing the same reference labels to the extent such parts and features are not otherwise distinguishable through drawing examination by one having ordinary skill in the art or distinguished by additional written description herein.

As used herein, electronic control unit (ECU), control module, module, control, controller, control unit, electronic control unit, processor and similar terms may refer to any hardware, software, firmware, electronic control component, processing logic, and/or processor device, individually or in any combination. In various embodiments, a control module may include any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 1:
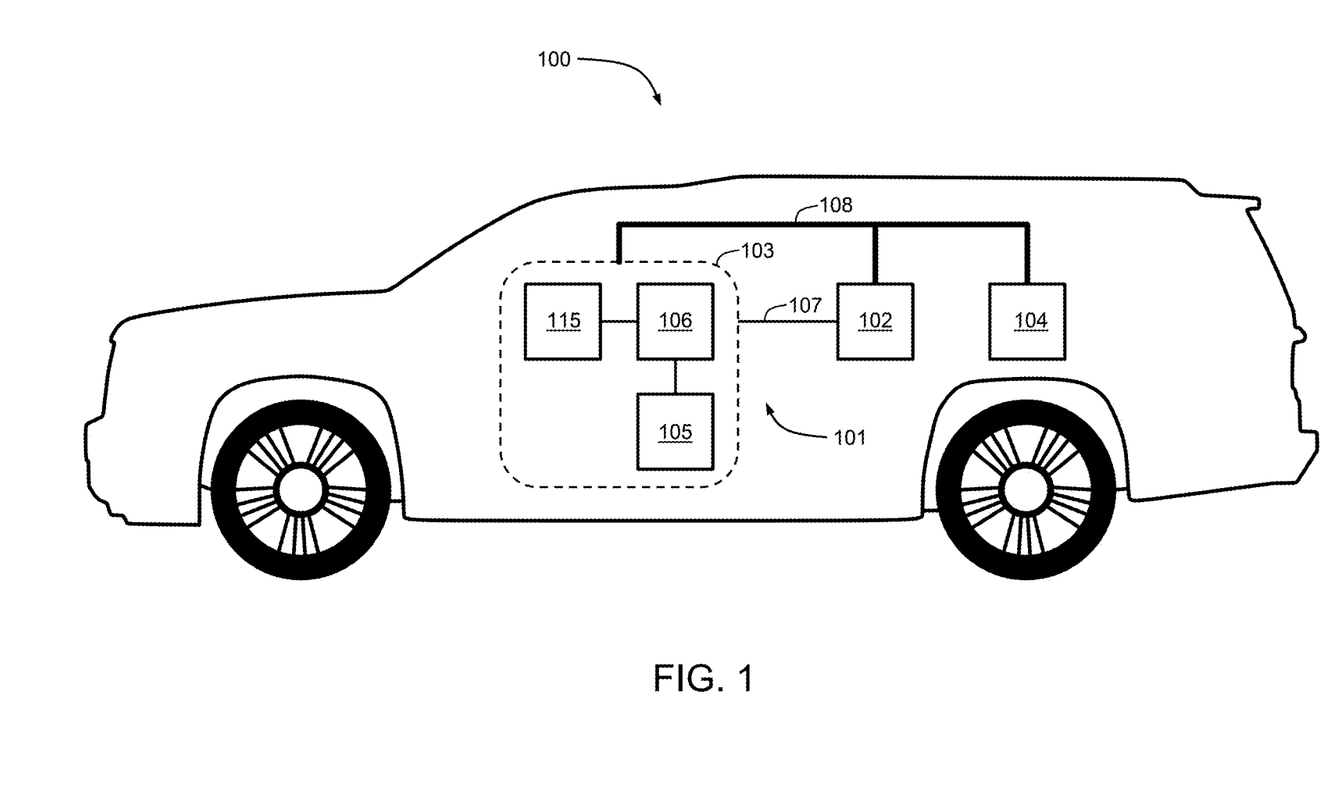
FIG. 1 illustrates a vehicle and propulsion system, in accordance with one or more embodiments.

FIG. 1 is a functional block diagram depicting an exemplary mobile platform as a vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. As is generally understood, the vehicle 100 may embody a body, chassis, and wheels rotationally coupled to the chassis. The vehicle 100 may be a four wheel vehicle, but the number of wheels may vary in other embodiments. The vehicle 100 may be autonomous or semi-autonomous. The vehicle 100 may include a vehicle propulsion system 101 including a rechargeable energy storage system (RESS) 102, an electric drive unit (EDU) 103 and an electric control unit (ECU) 104. The EDU 103 may include a transmission 115, a fluid circuit 105, and an electric machine (electric propulsion motor 106). As used herein, RESS 102 may include a high voltage battery pack primarily for servicing the EDU 103 and one or more low voltage batteries primarily for servicing low voltage vehicle loads. A high voltage (HV) direct current (DC) bus 107 provides electrical power transfer between the EDU 103 and a rechargeable energy storage system 102. In various embodiments, the RESS 102 and the EDU 103 may be operatively coupled to one or more on-vehicle components and systems, including the ECU 104, via a communication bus 108.

The RESS 102 is generally operational to store energy used by the electric propulsion motor 106. In a charging mode, the RESS 102 may receive electrical current from a generator and/or external source. In a discharging mode, the RESS 102 may provide electrical current to the electric propulsion motor 106 and other loads. The RESS 102 may include multiple battery modules electrically connected in series and/or in parallel between a positive battery pack terminal and a negative battery pack terminal. In various embodiments, the RESS 102 may provide approximately 200 to 1,000 volts DC electrical potential between the positive battery pack terminal and the negative battery pack terminal. Other battery voltages may be implemented to meet the design criteria of a particular application. The RESS 102 may be physically and electrically coupled to the HV DC bus 107.

The transmission 115 is generally operational to transfer mechanical torque from the electric propulsion motor 106 to the wheels of the vehicle 100. In various embodiments, the transmission 115 may implement a geared transmission. In other embodiments, the transmission 115 may implement a continuously variable transmission.

The fluid circuit 105 is generally operational to provide a working fluid to the electric propulsion motor 106. The fluid may be used to lubricate and/or cool the electric propulsion motor 106. In various embodiments, the fluid may be circulated within the EDU 103 including through the electric propulsion motor 106. In some embodiments, the fluid circuit 105 may include a sump providing a return reservoir for circulated fluid and mechanically or electrically driven fluid pump(s). Fluid flow rate may be known to the ECU 104 directly through flow sensing or indirectly through modeling and calibrations. In some embodiments, the fluid may be an oil and/or a coolant.

The electric propulsion motor 106 may be a drive motor for the vehicle 100. The electric propulsion motor 106 is generally operational to provide rotation and torque to drive wheels of the vehicle 100. The electrical power consumed by the electric propulsion motor 106 may be provided by the RESS 102 via the HV DC bus 107 to a power inverter (not shown) which converts the DC to multiphase alternating current (AC). The electric propulsion motor 106 may be a multiphase AC motor including a stator and a rotor. The rotor may be disposed within the stator and separated from the stator by an air gap. Alternatively, the stator may be disposed within the rotor. A rotor shaft may be connected to the rotor. In an embodiment, the rotor and the stator may include respective cores fabricated from stacked laminations of electrical steel. The stator core may generally include a plurality of teeth adjacent to and delimiting winding slots. Stator teeth extend radially from a yoke at a proximal end toward the rotor at a distal end. Exemplary stator structures are described in further detail herein with respect to various embodiments.

Figure 2:
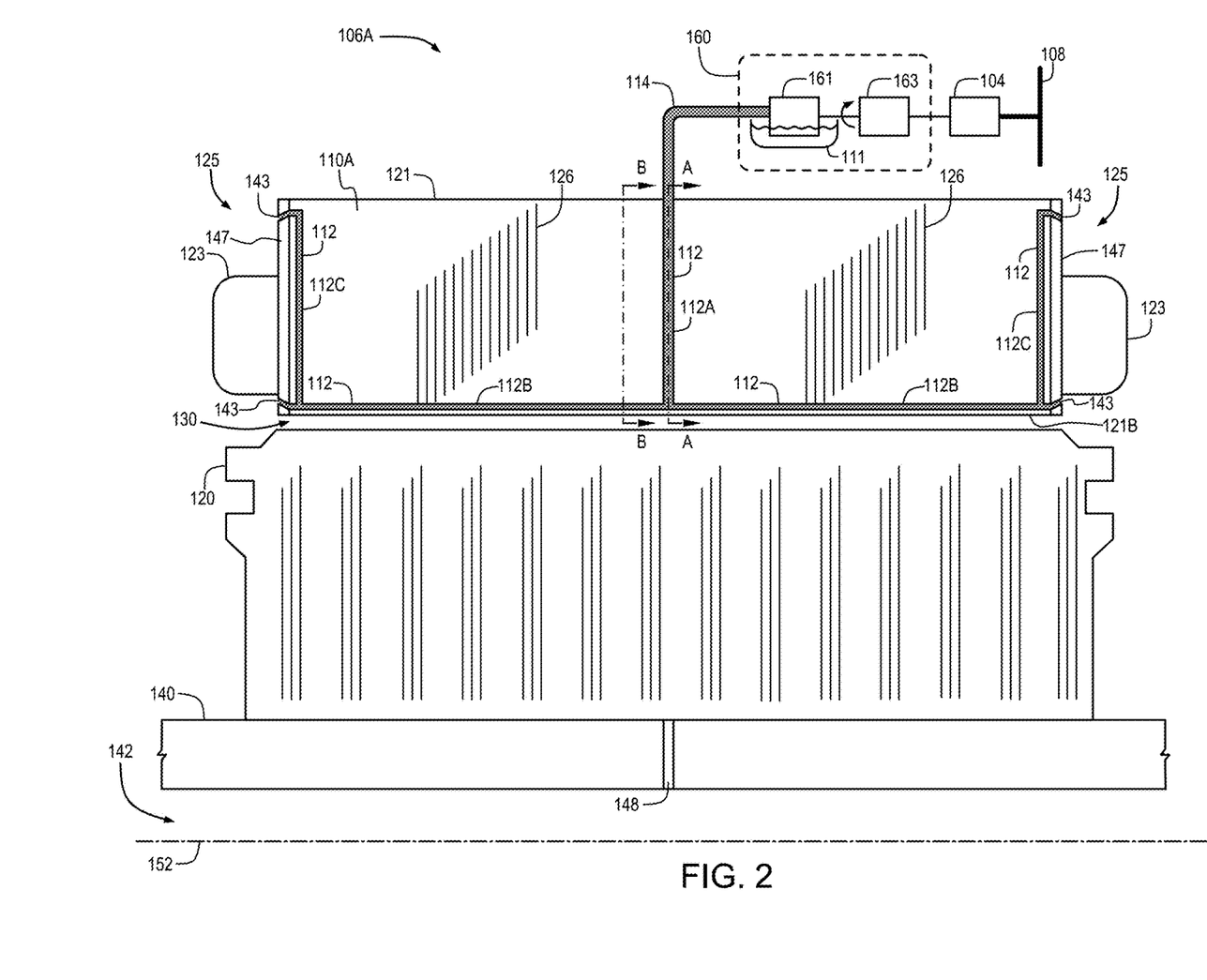
FIG. 2 illustrates an electric propulsion motor, in accordance with one or more embodiments.
Figure 3:
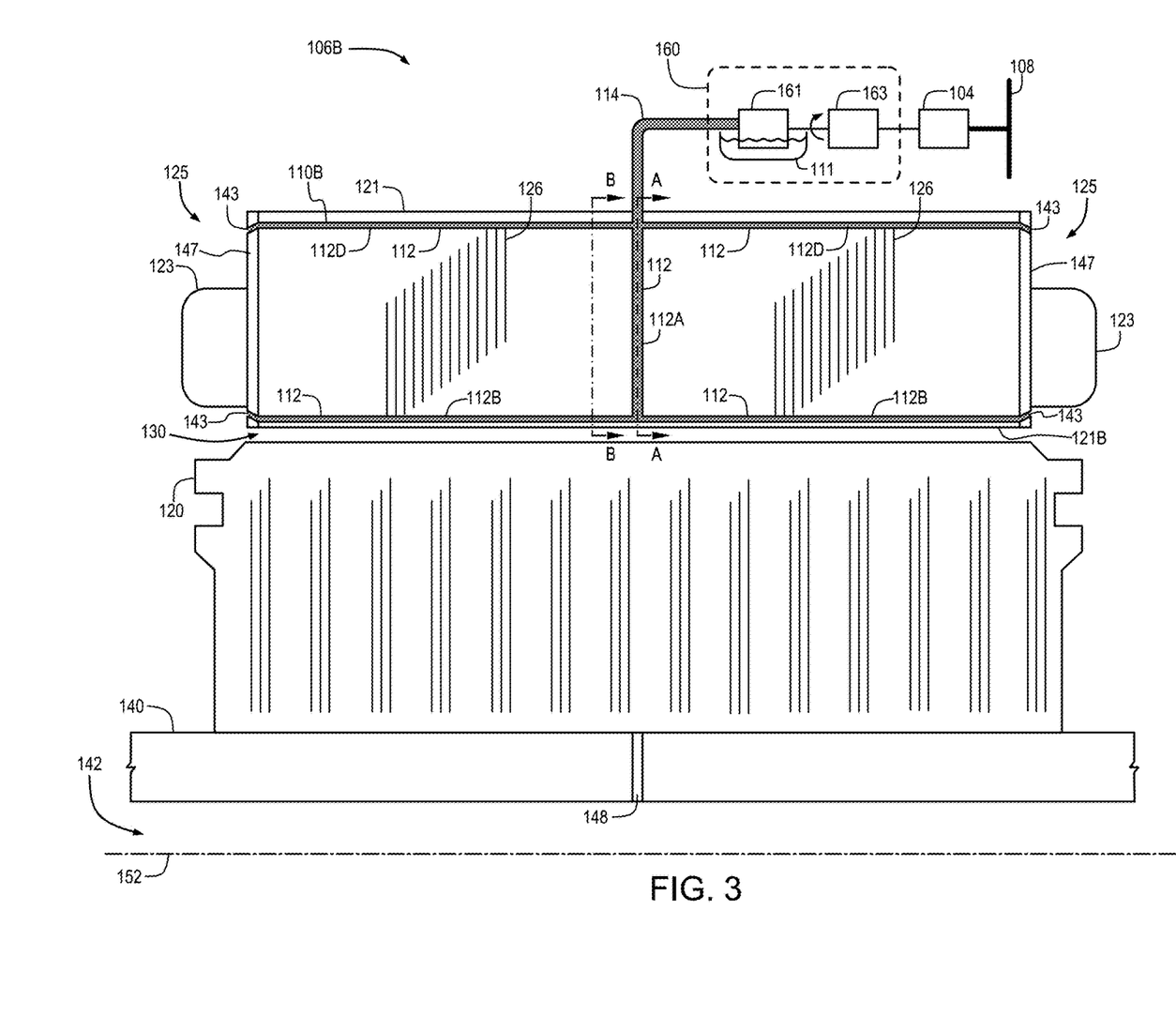
FIG. 3 illustrates an electric propulsion motor, in accordance with one or more embodiments.

Referring to FIGS. 2 and 3, schematic cross-sectional diagrams of an electric propulsion motor 106 (FIG. 1) are illustrated in accordance with respective exemplary embodiments. The electric propulsion motors 106A (FIGS. 2) and 106B (FIG. 3) include a stator 110A and 110B, a stator external fluid conduit 114, a rotor 120, an air gap 130, a rotor shaft 140, and a fluid pump 160. The fluid pump 160 may include a pump section 161 operatively coupled to an electric pump motor 163 and in fluid communication with a source of fluid (e.g., fluid sump 111). The electric pump motor 163 may be powered by a low voltage battery of the RESS 102. The pump section 161 may alternatively be mechanically driven directly from the rotor shaft 140 or a rotating component of the transmission 115. The pump section 161 may be configured for drawing fluid from the sump 111 and delivering it to the stator external fluid conduit 114 for provision to the stator as described further herein. The stator external fluid conduit 114 may include, for example, a fluid jacket (not shown) surrounding the stator, or fluid pipes/tubes. Though not separately illustrated, the fluid conduit 114 may include other fluid routings including through a radiator for cooling the circulating fluid. The electric pump motor 163 may be signally coupled to the ECU 104 for receiving control commands therefrom and providing information thereto.

Each stator 110A and 110B may be a respective embodiment of the stator 110 as generally described herein with respect to FIG. 1. The stators 110A and 110B may include multiple stacked laminations 126 of electrical steel forming a cylindrical core including a yoke and a plurality of teeth and winding slots set forth in more detail herein. The stators 110A and 110B may include multiphase AC windings within the winding slots which receive multiphase AC from the power inverter to establish a rotating magnetic field exerting torque upon the rotor 120. The windings are generally contained withing the winding slots with end turns 123 extending beyond the cylindrical core limits at axially opposite ends 125 of the stators 110A and 110B. The stators 110A and 110B may include at least one stator internal fluid passage 112 therethrough. The fluid passages 112 are in fluid communication with the stator external fluid conduit 114 at or near the outer periphery 121A of the stators 110A and 110B and receive pressurized fluid therefrom. In both embodiments of FIGS. 2 and 3, the fluid passages 112 may include a radial fluid passage 112A located approximately midway between opposite axial ends 125 of the stators 110A and 110B along an axis of rotation 152 of the electric propulsion motors 106A and 106B and configured to direct pressurized fluid radially in the direction of the rotor 120 toward the inner periphery 121B of the stators 110A and 110B. Other locations between opposite axial ends 125 of the stators 110A and 110B for fluid passages 112A may be employed. In an embodiment, the fluid passages 112A may be formed within one or several adjacent laminations 126 of the lamination stack in accordance with cross section dimensions and fluid flow considerations. One function of the radial fluid passages 112A is to contain and direct pressurized fluid from the stator external fluid conduit 114 radially in the direction of the rotor 120 toward the inner periphery 121B of the stators 110A and 110B.

In an embodiment, the fluid passages 112A may be fluidly coupled to axial channels 112B corresponding to the distal ends of the stator teeth. The axial channels 112B may extend between axially opposite ends 125 of the stators 110A and 110B.

Figure 4A:
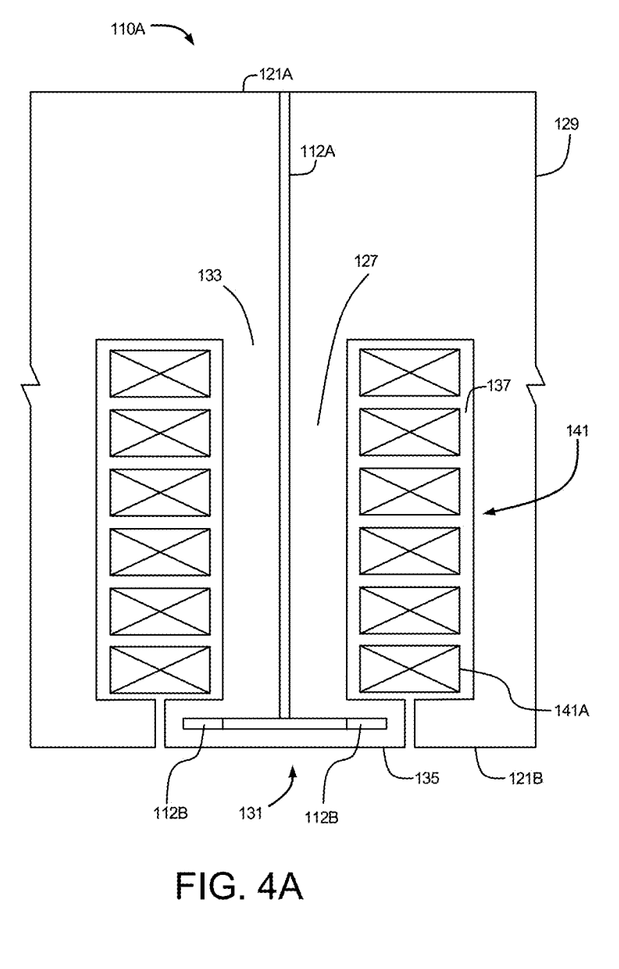
FIGS. 4A and 4B illustrate partial sectional views of a stator of the electric propulsion motor of FIG. 2, in accordance with one or more embodiments.
Figure 4B:
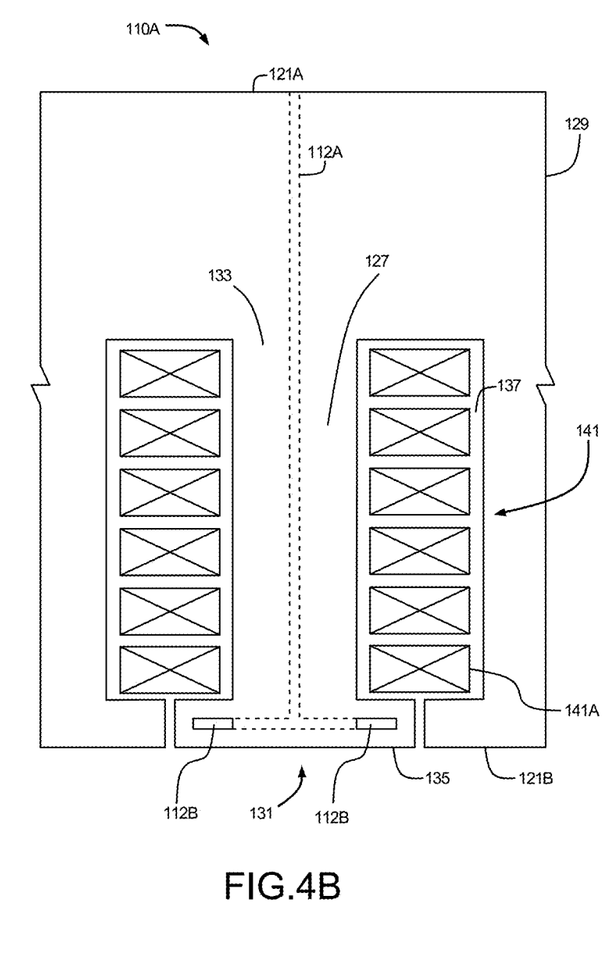

With additional reference to FIG. 4A, a partial sectional view through the section line A-A of FIG. 2 is illustrated which schematically represents a portion of the stator 110A ignoring curvature at the outer periphery 121A and at the inner periphery 121B of the stator 110A. Similarly, with reference to FIG. 4B, a partial sectional view through the section line B-B of FIG. 2 is illustrated which schematically represents a portion of the stator 110A ignoring curvature at the outer periphery 121A and at the inner periphery 121B of the stator 110A. Each partial section view may be through a respective lamination or at the interface of adjacent laminations. The partial section illustrated in FIG. 4A is through the radial fluid passage 112A which runs from the outer periphery 121A radially toward the inner periphery 121B of the stator 110A. The partial section illustrated in FIG. 4B is not through the radial fluid passage 112A but is illustrated by dashed hidden lines. The radial fluid passage 112A passes through the yoke 129 and a tooth 127 of the stator 110A and is fluidly coupled at the distal end 131 of the tooth 127 to axial channels 112B.

Each tooth 127 of the stator 110A runs from the yoke 129 at a proximal end 133 and terminates at the inner periphery 121B at the distal end 131. Each tooth 127 is adjacent to and delimits winding slots 137. Each winding slot directionally has a bottom corresponding to the proximal end 133 of the teeth 127 at the yoke 129 and a top corresponding to the distal end 131 of the teeth 127. Each tooth 127 includes tooth tips 135 that extend circumferentially at the distal end 131 of the tooth toward adjacent teeth 127 and further delimit winding slots 137.

Winding conductors 141 are contained within the slots 137. Winding conductors 141 may include hair pin conductors which may be inserted from the ends 125 of the stator 110A and locally terminate at the end turns 123 (FIG. 2). FIGS. 4A and 4B illustrate multilayer, hairpin conductors with single-conductor layers. Multi-conductor layers may be implemented also. Hairpin conductor windings may be wave or lap wound and may be concentrated or distributed in accordance with the motor design. In the illustrated embodiment of FIGS. 4A and 4B, the conductors are all equivalent in cross section and are six deep in a single-conductor layers. In the present embodiments, the top conductors 141A in a multi-layer winding may be adjacent to and radially constrained by tooth tips 135. In the present embodiments, the tooth tips 135 and axial channels 112B may be radially adjacent and above the top conductors 141A.

The axial channels 112B are at least partially circumscribed by the tooth tips 135 and thus may at least partially be radially above the top conductors 141A. Tooth tips 135 may be formed in individual laminations using conventional lamination fabrications techniques including stamping. As such, stamping tool limits and material limits (e.g., typically 0.25 to 0.5 mm thick electrical steel) may dictate the tooth wall thickness defining the axial channels 112B. For example, tooth wall thickness for conventionally stamped electrical steel laminations may be limited to a minimum of about 0.5 mm to about 0.6 mm. Thus, a channel radial height of about 0.3 mm to about 0.4 mm may require a minimum tooth radial dimension of substantially about 1.3 mm to about 1.6 mm using stamping processes and electrical steel. Alternative fabrication processes (e.g., laser cutting) may also be employed.

With reference back to FIG. 2, the fluid passages 112 may include end fluid passages 112C at axially opposite ends 125 of the stators 110A. The axial channels 112B may be in fluid communication with the end fluid passages 112C. The end fluid passages 112C may be configured to direct pressurized fluid radially toward the outer periphery 121A of the stator 110A. In an embodiment, the fluid passages 112C may be formed within one or several adjacent laminations 126 of the lamination stack in accordance with cross section dimensions and fluid flow considerations. The fluid passages 112C may be in fluid communication with fluid outlets 143 at the axially opposite ends 125 of the stator 110A. These fluid outlets 143 may be restricted relative to the fluid passages 112 in order to raise the pressure locally at the outlets 143 and directionally angled toward the end turns 123 to spray fluid exiting the rotor 110A upon the end turns 123 for end turn cooling. The fluid after exiting the stator 110A returns to the sump 111 where it is picked up by the pump section 161 for recirculation as described. The fluid outlets 143 may be formed in an endplate 147 of electrical steel or other material, including one or more standard thickness laminations 126 or non-standard thicker lamination having aperture(s) functioning as directional jets as described herein. Apertures may be formed by any known process such as stamping, drilling, or laser cutting.

Thus, it is appreciated that pressurized fluid from the fluid passage 112A is delivered to the axial channels 112B and flows therethrough to end fluid passages 112C and through fluid outlets 143 where it exits the stator. The fluid as it passes through the axial channels 112B absorb heat directly from the tooth tips 135.

Figure 5A:
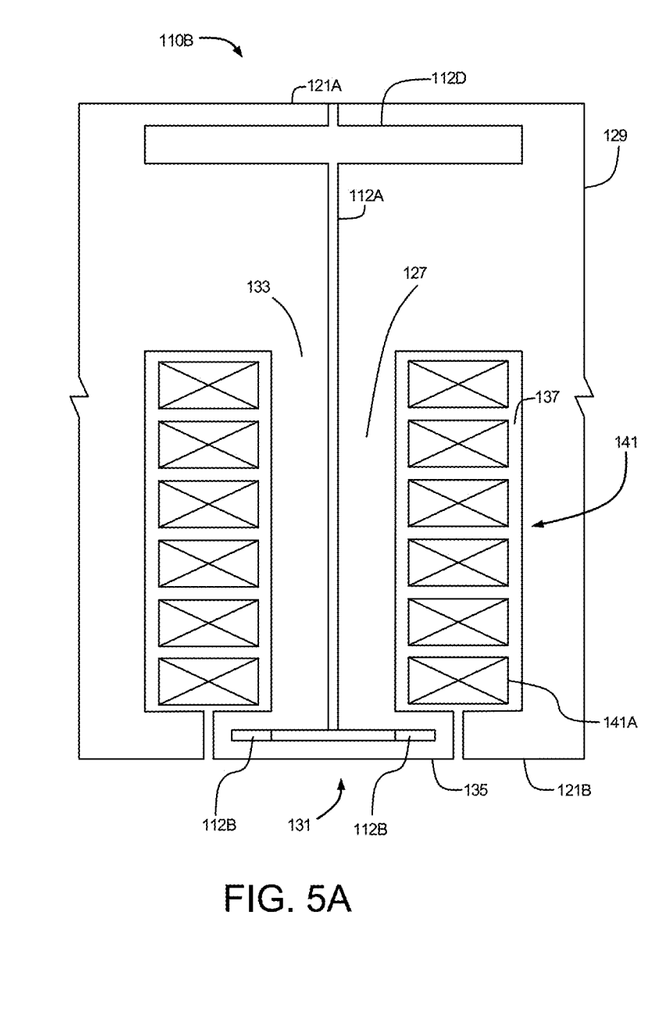
FIGS. 5A and 5B illustrate partial sectional views of a stator of the electric propulsion motor of FIG. 3, in accordance with one or more embodiments.
Figure 5B:
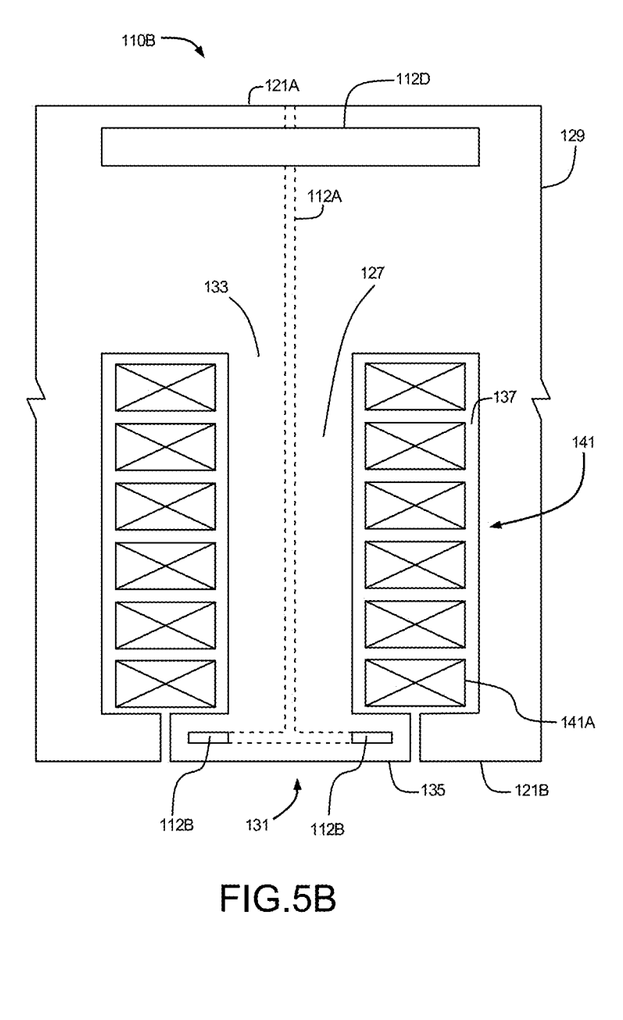

With additional reference to FIG. 5A, a partial sectional view through the section line A-A of FIG. 3 is illustrated which schematically represents a portion of the stator 110B ignoring curvature at the outer periphery 121A and at the inner periphery 121B of the stator 110B. Similarly, with reference to FIG. 5B, a partial sectional view through the section line B-B of FIG. 3 is illustrated which schematically represents a portion of the stator 110B ignoring curvature at the outer periphery 121A and at the inner periphery 121B of the stator 110B. Each partial section view may be through a respective lamination or at the interface of adjacent laminations. The partial section illustrated in FIG. 5A is through the radial fluid passage 112A which runs from the outer periphery 121A radially toward the inner periphery 121B of the stator 110B. The partial section illustrated in FIG. 5B is not through the radial fluid passage 112A which is illustrated by dashed hidden lines. The radial fluid passage 112A passes through the yoke 129 and a tooth 127 of the stator 110A and is fluidly coupled at the distal end 131 of the tooth 127 to axial channels 112B.

In the embodiments of FIGS. 5A and 5B, axial channels 112D are located within the yoke 129 of the stator 110B and may be in fluid communication with the radial fluid passage 112A. The axial channels 112D are in fluid communication with the stator external fluid conduit 114 and receive pressurized fluid therefrom. The axial channels 112D may extend between axially opposite ends 125 of the stator 110B similar to the axial channels 112B.

With the exception of the axial channels 112D within the yoke 129, the description of the partial sectional views of FIGS. 4A and 4B corresponding to the embodiment of FIG. 2 apply equally to the partial sectional views of FIGS. 5A and 5B corresponding to the embodiment of FIG. 3.

With reference back to FIG. 3, in distinction from the embodiment of FIG. 2, the axial channels 112B and the axial channels 112D directly supply pressurized fluid to the fluid outlets 143 at the axially opposite ends 125 of the stator 110B. These fluid outlets 143 may be restricted relative to the fluid passages 112 in order to raise the pressure locally at the outlets 143 and directionally angled toward the end turns 123 to spray fluid exiting the rotor 110B upon the end turns 123 for end turn cooling. The fluid after exiting the stator 110B returns to the sump 111 where it is picked up by the pump section 161 for recirculation as described. The fluid outlets 143 may be formed in an endplate 147 of magnetic or non-magnetic material, including one or more laminations 126 having aperture(s) functioning as directional jets as described herein. Apertures may be formed by any known process such as stamping, drilling, or laser cutting.

Thus, it is appreciated that pressurized fluid from the fluid passage 112A is delivered to the axial channels 112B and flows therethrough and through fluid outlets 143 where it exits the stator. The fluid as it passes through the axial channels 112B absorb heat directly from the tooth tips 135.

Figure 6:
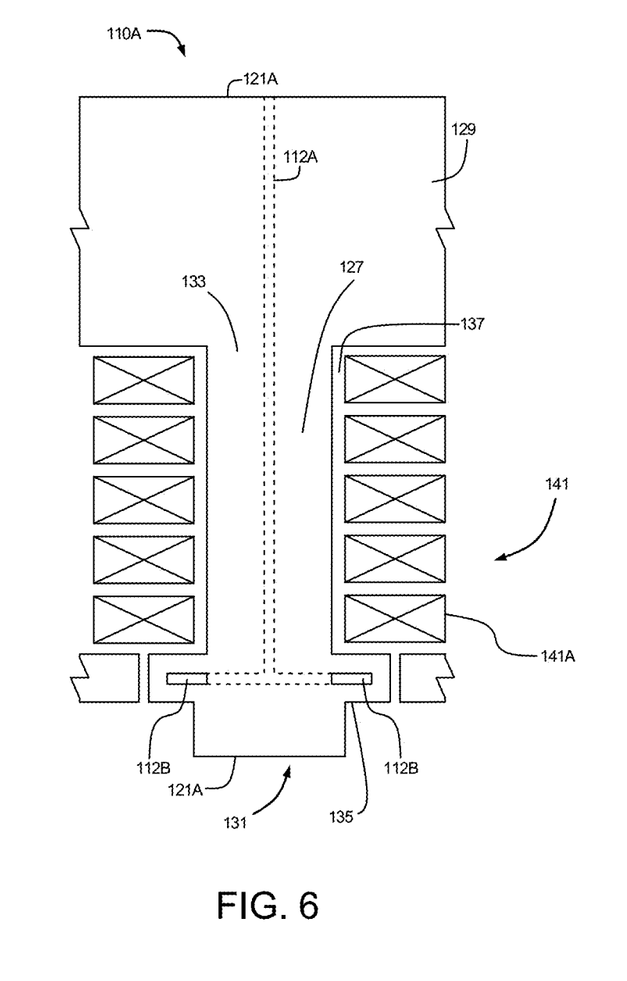
FIG. 6 illustrates a partial sectional view of a stator of the electric propulsion motor of FIG. 2, in accordance with one or more embodiments.

With additional reference to FIG. 6, a partial sectional view through the section line B-B of FIG. 2 is illustrated which schematically represents a portion of the stator 110A ignoring curvature at the outer periphery 121A and at the inner periphery 121B of the stator 110A. The partial section view may be through a respective lamination or at the interface of adjacent laminations. The partial section illustrated in FIG. 6 is not through the radial fluid passage 112A which is illustrated by dashed hidden lines. The radial fluid passage 112A passes through the yoke 129 and a tooth 127 of the stator 110A and is fluidly coupled at the distal end 131 of the tooth 127 to axial channels 112B.

Each tooth 127 of the stator 110A runs from the yoke 129 at a proximal end 133 and terminates at the inner periphery 121B at the distal end 131. Each tooth 127 is adjacent to and delimits winding slots 137. Each winding slot directionally has a bottom corresponding to the proximal end 133 of the teeth 127 at the yoke 129 and a top corresponding to the distal end 131 of the teeth 127. Each tooth 127 includes tooth tips 135 that extend circumferentially at the distal end 131 of the tooth toward adjacent teeth 127 and further delimit winding slots 137. In the embodiment of FIG. 6, the tooth tips 135 are closer to the proximal ends of the teeth than the tooth tips 135 in the embodiment of FIG. 4B, are below the inner periphery 121B of the stator 110A and claim some of the depth of the slot 137. In other words, the tooth tips 135 are radially inboard of the extreme radial position of the tooth 127. Thus, it is appreciated that in the embodiment of FIG. 6 a conductor layer may be displaced, thereby resulting in five conductor layers versus six conductor layers as in the embodiment of FIG. 4B.

Winding conductors 141 are contained within the slots 137. Winding conductors 141 may include hair pin windings which may be inserted from the ends 125 of the stator 110A and locally terminate at the end turns 123 (FIG. 2). FIG. 6 illustrates multilayer, hairpin conductors with single-conductor layers. Multi-conductor layers may be implemented also. Hairpin conductor windings may be wave or lap wound and may be concentrated or distributed in accordance with the motor design. In the illustrated embodiment of FIG. 6, the conductors are all equivalent in cross section. In the present embodiment, the top conductors 141A in the multilayer winding conductors 141 may be adjacent to and radially constrained by tooth tips 135. In the present embodiment, the tooth tips 135 may be radially adjacent and above the top conductors 141A.

Figure 7:
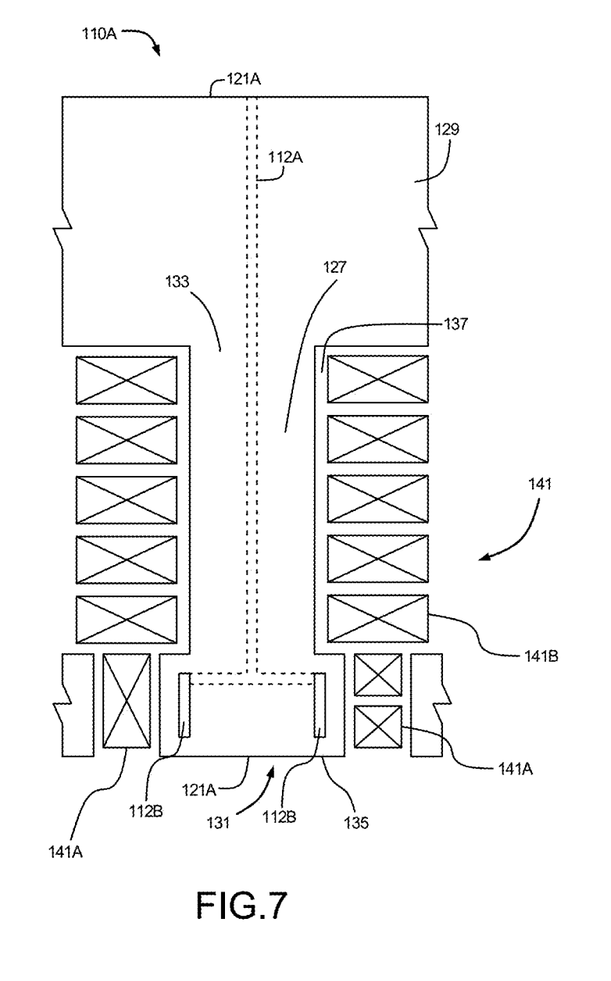
FIG. 7 illustrates a partial sectional view of a stator of the electric propulsion motor of FIG. 2, in accordance with one or more embodiments.

With additional reference to FIG. 7, a partial sectional view through the section line B-B of FIG. 2 is illustrated which schematically represents a portion of the stator 110A ignoring curvature at the outer periphery 121A and at the inner periphery 121B of the stator 110A. The partial section view may be through a respective lamination or at the interface of adjacent laminations. The partial section illustrated in FIG. 7 is not through the radial fluid passage 112A which is illustrated by dashed hidden lines. The radial fluid passage 112A passes through the yoke 129 and a tooth 127 of the stator 110A and is fluidly coupled at the distal end 131 of the tooth 127 to axial channels 112B.

Each tooth 127 of the stator 110A runs from the yoke 129 at a proximal end 133 and terminates at the inner periphery 121B at the distal end 131. Each tooth 127 is adjacent to and delimits winding slots 137. Each winding slot directionally has a bottom corresponding to the proximal end 133 of the teeth 127 at the yoke 129 and a top corresponding to the distal end 131 of the teeth 127. Each tooth 127 includes tooth tips 135 that extend circumferentially at the distal end 131 of the tooth toward adjacent teeth 127 and further delimit winding slots 137. In the embodiment of FIG. 7, the tooth tips 135 are radially thicker but circumferentially narrower than the tooth tips 135 in the other embodiments herein and claim some of the depth of the slot 137. Thus, it is appreciated that in the embodiment of FIG. 7 a conductor layer may be displaced, thereby resulting in five conductor layers below the tooth tips 135 and axial channels 112B versus six conductor layers as in the embodiment of FIG. 4B. Advantageously, however, the circumferentially narrower dimensioning of the tooth tips 135 provides usable slot space between the tooth tips which one or more top conductors 141A may occupy. In FIG. 7, the useable slot space adjacent the right-hand tooth tip is shown occupied by two conductors sized smaller than the other conductors below them, whereas the useable slot space adjacent the left-hand tooth tip is shown occupied by one conductor sized approximately equivalent to the other conductors below it. Such arrangements illustrate alternative conductors and may not represent an actual conductor layout. Thus, in the embodiment of FIG. 7, the axial channels 112B may be radially adjacent and above one conductor 141B that is below the top conductors 141A that are circumferentially adjacent the axial channels 112B and tooth tips 135.

Winding conductors 141 are contained within the slots 137. Winding conductors 141 may include hair pin windings which may be inserted from the ends 125 of the stator 110A and locally terminate at the end turns 123 (FIG. 2). FIG. 7 illustrates multilayer, hairpin conductors with single-conductor layers. Multi-conductor layers may be implemented also. Hairpin conductor windings may be wave or lap wound and may be concentrated or distributed in accordance with the motor design. In the illustrated embodiment of FIG. 7, the conductors may have varying cross section in accordance with their slot positions. In the present embodiment, the top conductors 141A in the multi-layer winding conductors 141 may be adjacent to and circumferentially constrained by tooth tips 135. In the present embodiment, the tooth tips 135 and the axial channels 112B may be radially adjacent and above one conductor 141B that is below the top conductors 141A that are circumferentially adjacent the axial channels 112B and tooth tips.

The various embodiments described herein are illustrated primarily with respect to a single tooth in a multi-tooth, multi-slot stator. It is understood that every tooth of a stator or select teeth of a stator may be configured as described with axial channels through the tooth tips. In an embodiment of a stator having a distributed winding, axial channels may be located in select ones of the teeth associated with fewer than all teeth adjacent the slots occupied by a phase belt. For example, in an eight-pole, three-phase motor with a stator having 96 teeth, the slots/pole/phase is equal to four and one phase belt may therefore occupy four adjacent slots. Thus, in a first embodiment, the two outer teeth adjacent the outer conductor slots may include axial channels at the tips to desirably maintain electromagnetic symmetry with respect to the corresponding phase belt. In a second embodiment, the two inner teeth adjacent the outer conductor slots may include axial channels at the tips to desirably maintain electromagnetic symmetry with respect to the corresponding phase belt. In a third embodiment, the medial tooth central to the four conductor slots may include axial channels at the tips to desirably maintain electromagnetic symmetry with respect to the corresponding phase belt. Combinations of any two of the first, second and third embodiments immediately above may yield additional embodiments of less than all teeth adjacent to the slots occupied by a phase belt having associated axial channels. Similarly, for electromagnetic symmetry, any of the embodiments wherein an axial channel in a tooth tip requires loss or modification of an adjacent conductor layer (e.g., embodiments of FIG. 6 or FIG. 7) may desirably be symmetrically imposed with respect to a corresponding phase belt.

The rotor 120 may be one embodiment of the rotor as generally described herein with respect to FIG. 1. The rotor 120 may include multiple annular stacked laminations forming a core. In a permanent magnet machine, the stacked laminations may include voids forming interior pockets for carrying permanent magnets. In an induction machine, the stacked laminations may include peripheral slots for carrying conduction bars. Alternative rotor constructions are known to those having ordinary skill in the art and may include, for example, surface mounted permanent magnet and wire wound rotors.

The rotor shaft 140 may be one embodiment of the rotor shaft as generally described herein with respect to FIG. 1. The rotor shaft 140 is affixed to the rotor 120 and rotates therewith about the axis of rotation 152. The rotor shaft 140 may include an axial fluid passage 142 and a lubrication hole 148 between the fluid passage 142 and passages in the rotor core (not illustrated). The rotor shaft 140 may be rotatably supported at both ends of the rotor 120 by bearings (not illustrated) and may transfer the mechanical torque generated by the rotor 120 to the transmission 115. The axial fluid passage 142 may receive pressurized fluid from an electrically or mechanically driven fluid pump supplying one end of the rotor shaft 140. The same fluid pump 160 used for the stator may also provide the pressurized fluid to the axial fluid passage of the rotor shaft 140. Alternatively, a separate pump may be employed. From the axial fluid passage 142, the fluid may flow into the lubrication hole 148 and through the passages in the rotor core. For example, fluid passages may run adjacent permanent magnets in an interior permanent magnet machine and fluid flow is designed to flow from a central inlet, through the fluid passages and out at opposite ends of the rotor core. Alternatively, fluid may flow from a central inlet, through the fluid passages from one end of the rotor core through to an opposite end of the rotor core and out. As with the fluid flow through the stator, once fluid has been directed through the rotor, it is generally free to flow back to the sump or other area within the EDU for retrieval and recirculation.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric machine, comprising:
a cylindrical stator including a yoke and radially extending teeth, the teeth being circumferentially spaced one from another to define winding slots between adjacent teeth;
multiple conductors disposed within the winding slots;
at least one of the teeth including a tooth tip extending circumferentially in a first direction toward a first adjacent tooth and circumferentially in a second direction, which is opposite the first direction, toward a second adjacent tooth and being radially adjacent a first one of the multiple conductors, the tooth tip having a first channel through which a pressurized fluid flows; and
a radial fluid passage through the yoke and the at least one of the teeth providing the pressurized fluid to the first channel, which includes a first axial channel that extends circumferentially in the first direction from the radial fluid passage and second axial channel that extends circumferentially in the second direction from the radial fluid passage.

2. The electric machine of claim 1, wherein the first channel is fluidly coupled to first fluid outlets at axially opposite ends of the stator.

3. The electric machine of claim 2, wherein the first fluid outlets direct the pressurized fluid as it exits the stator onto end turns of the conductors at the axially opposite ends of the stator.

4. The electric machine of claim 2, wherein the first fluid outlets are through end plates fabricated from multiple electrical steel laminations.

5. The electric machine of claim 1, further comprising a second channel oriented axially through the yoke and fluidly coupled to the radial fluid passage.

6. The electric machine of claim 5, wherein the second channel is fluidly coupled to second fluid outlets at axially opposite ends of the stator.

7. The electric machine of claim 6, wherein the second fluid outlets direct the pressurized fluid as it exits the stator onto end turns of the conductors at the axially opposite ends of the stator.

8. The electric machine of claim 1, wherein the tooth tip is circumferentially adjacent a second one of the multiple conductors.

9. The electric machine of claim 1, wherein the tooth tip is radially inboard of an extreme radial position of the tooth.

10. An electric propulsion motor system, comprising:
an electric propulsion motor including a cylindrical stator and a rotor rotatably disposed within the stator;
a fluid circulation system providing a pressurized fluid;
the cylindrical stator including a yoke and a plurality of teeth extending radially inward from the yoke at proximal ends to an inner periphery at distal ends, the plurality of teeth circumferentially arranged in spaced adjacency to define winding slots between adjacent teeth;

a respective plurality of conductors disposed within each winding slot and forming end turns outside of the winding slots at axially opposite ends of the stator; and a set of the plurality of teeth including respective tooth tips extending circumferentially in a first direction toward a first adjacent tooth and circumferentially in a second direction, which is opposite the first direction, toward a second adjacent tooth and being radially adjacent a first one of the respective plurality of conductors disposed within the respective adjacent winding slot, the respective tooth tips having a respective first channel through which the pressurized fluid flows; and a radial fluid passage through the yoke and the at least one of the teeth providing the pressurized fluid to the first channel, which includes a first axial channel that extends circumferentially in the first direction from the radial fluid passage and second axial channel that extends circumferentially in the second direction from the radial fluid passage.

11. The electric propulsion motor system of claim 10, wherein each respective first channel is fluidly coupled to respective first fluid outlets directing the pressurized fluid as it exits the stator onto the end turns outside of the winding slots at axially opposite ends of the stator.

12. The electric propulsion motor system of claim 11, wherein the first fluid outlets are through end plates.

13. The electric propulsion motor system of claim 11, wherein the pressurized fluid flows through the rotor.

14. The electric propulsion motor system of claim 10, further comprising a plurality of second channels oriented axially through the yoke and fluidly coupled to the pressurized fluid.

15. The electric propulsion motor system of claim 14, wherein the plurality of second channels is fluidly coupled to second fluid outlets directing the pressurized fluid as it exits the stator onto the end turns outside of the winding slots at axially opposite ends of the stator.

16. The electric propulsion motor system of claim 10, wherein each respective tooth tip is circumferentially adjacent a second one of the respective plurality of conductors disposed within the respective adjacent winding slot.

17. The electric propulsion motor system of claim 10, wherein each respective tooth tip is radially inboard of the inner periphery.

18. An electrified vehicle, comprising:

an electric drive unit including an electric propulsion motor having a cylindrical stator with fluid passages therethrough and a fluid pump providing pressurized fluid to the fluid passages; and the fluid passages through the stator including axial passages within stator tooth tips wherein the stator tooth tips extend circumferentially in a first direction toward a first adjacent tooth and circumferentially in a second direction, which is opposite the first direction, toward a second adjacent tooth slots and are adjacent at least one conductor disposed within a respective adjacent winding slot; and a radial fluid passage through the yoke and the at least one of the teeth providing the pressurized fluid to the first channel, which includes a first axial channel that extends circumferentially in the first direction from the radial fluid passage and second axial channel that extends circumferentially in the second direction from the radial fluid passage.

\* \* \* \* \*